Aug. 6, 1935.   W. G. LAIRD   2,010,798
FLUID STORAGE AND TREATMENT
Original Filed Nov. 17, 1923   2 Sheets-Sheet 1
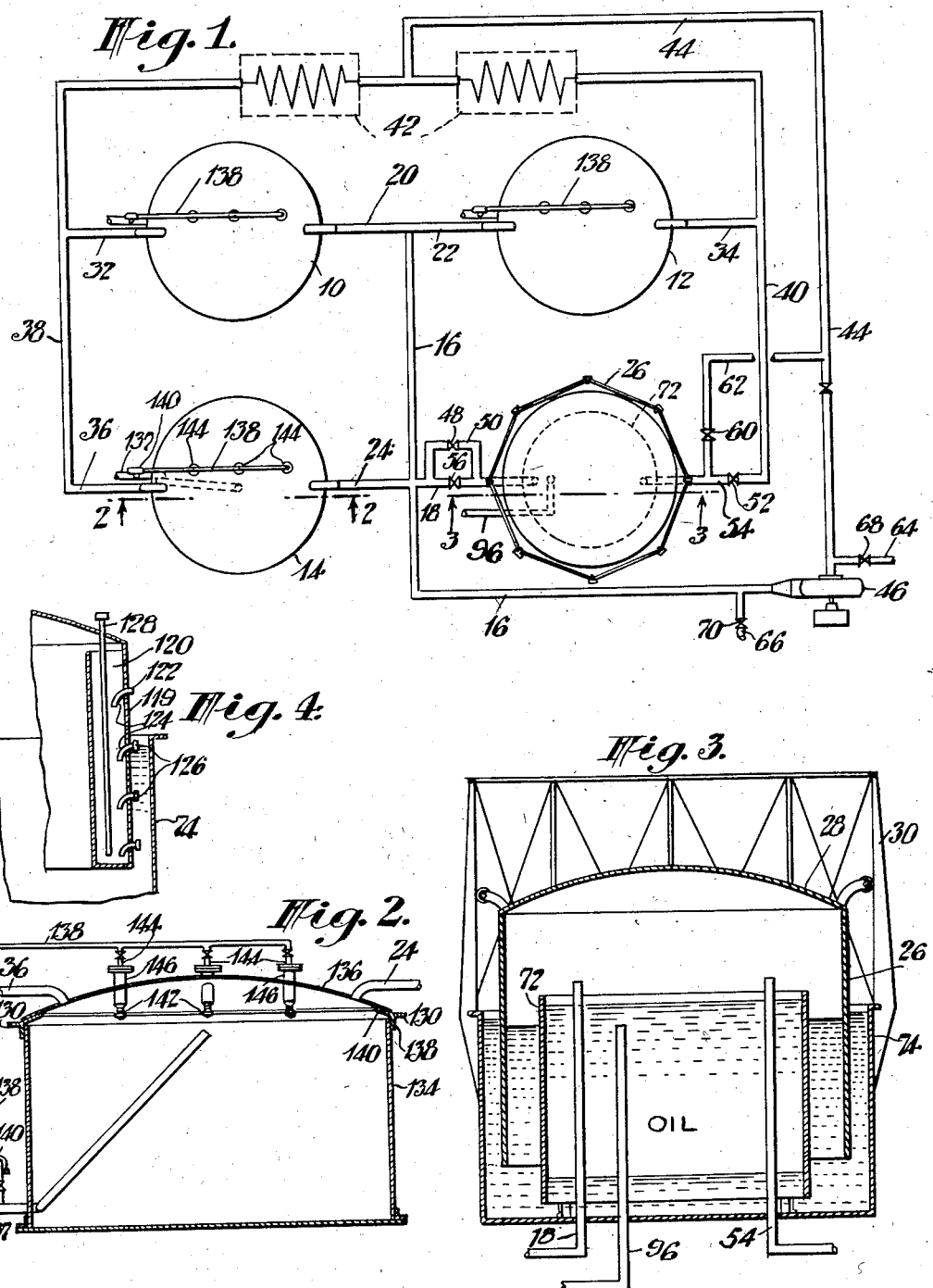
INVENTOR
WILBUR G. LAIRD
BY
ATTORNEY

INVENTOR
WILBUR G. LAIRD
BY
ATTORNEY

Patented Aug. 6, 1935

2,010,798

UNITED STATES PATENT OFFICE 2,010,798

FLUID STORAGE AND TREATMENT

Wilbur G. Laird, Pleasantville, N. Y., assignor to Doherty Research Company, New York, N. Y., a corporation of Delaware Original application November 17, 1923, Serial No. 675,287. Divided and this application January 15, 1931, Serial No. 508,933

8 Claims. (Cl. 220—85)

This invention relates to a method and apparatus for storing fluids and, more particularly, to methods and apparatus for the storage of gases and of petroleum and for the treatment of the petroleum during storage. The invention was originally described in my U. S. Letters Patent No. 1,794,383 granted May 3rd, 1931 on application filed November 17th, 1923 of which this application is a division.

The storage of petroleum and its more volatile products in such a way as to protect them against loss through evaporation and against danger of fires involves a number of difficulties. As the temperature of the petroleum rises, it tends to give off dissolved gases and vapors and, if the liquid is in contact with the atmosphere, the loss is increased by the greater tendency for the evolved gases to permeate this atmosphere until saturated. Owing to the very great size of the tanks required for the economical storage of the oil and to the pressure that would be generated on a hot day by this evolution of gases and vapors, it would be impracticable or impossible to construct closed tanks of sufficient size and strength to confine the petroleum and its products under the pressure of their own vapors. Even the most efficient storage methods therefore merely cover the tanks, in which the liquid is stored, with a roof of sufficient tightness to hold the vapors under slight pressure and prevent the free circulation of air thereinto, but which is provided with vents that enable air to be drawn in when the pressure in the tank drops below a definite limit and permits this air, together with whatever vapors it has picked up, to be expelled when the pressure rises to a fixed limit, slightly above that of the outside atmosphere. Accordingly, when the vapor space in the interior of the tank is cooled, as at night or in a rain storm, air is drawn into the storage tank, becomes carburetted by contact with the stored liquid, and upon the reheating of the vapor by the sun's rays, this pressure in the tank is increased and the air and vapors are expelled, the cycle being repeated to a greater or less extent with each change in atmospheric conditions.

These disadvantages are overcome by my present invention an object of which is to provide a method and apparatus for storing liquids of this type by which they are protected from contact with circulating or changing bodies of air or gases and are in contact with bodies of their own vapors or gases.

Another object of the invention is to provide a method and apparatus by which vapors and gases from a number of closed tanks may be permitted to breathe into and from a closed system without exposure to the outside atmosphere.

In this breathing of the vapors some of the lighter vapors from the crude petroleum are driven from the liquid in the outward breaths and returned with the inspirations. In the case of crude petroleum, these lighter vapors are those most sought after in the refining processes to which the petroleum is to be later subjected, and, if recovered would form a valuable product. Accordingly, another object of my invention is to provide a method and apparatus by which these volatile products may be isolated and removed from the gases and vapors later drawn into the tanks when breathing in.

In connection with the storage of liquids in this manner, the invention contemplates the use of a gas and vapor holder, the holding capacity of which increases to receive vapors from the liquid storage tanks as they breathe out and contracts to return the stored vapors and gases as the tanks breathe in. As gas holders of this type involve the use of a rising and falling bell and a sealing tank of large storage capacity, it is desirable to use this storage space for the storage of oil or other liquids to be stored. This can not be done in the usual type of holder because, as the bell rises and falls, it would carry a film of the petroleum on its outer surface that would increase the loss through evaporation and would create a dangerous fire hazard.

Another object accomplished by my invention is therefore to provide a gas holder or storage device that provides a liquid storage space out of direct contact with the atmosphere and out of contact with a rising and falling gas bell covering the stored liquid.

As the number of tanks that may be cared for by a single holder is limited, it is desirable to have all of the tanks and holders under a common system, another object of the invention is to provide apparatus by means of which the various holders may be automatically maintained in balance when interconnected.

Other objects of the invention are to provide an improved roof of cheap and simple construction for storage tanks and gas holders adapted to the objects set forth above, and to provide means for increasing the recovery of light products from stored petroleum.

With these and other objects in view, the invention comprises the methods and apparatus described and set forth in the following specification and claims.

The various features of the invention are illustrated in the accompanying drawings, in which:

Fig. 1 is a diagrammatic plan view of a storage system embodying a form of my invention, details of construction, such as line drips, condenser draw-offs and similar details being omitted in this and subsequent figures for the sake of clearness.

Fig. 2 is an enlarged vertical section taken on line 2—2 of Fig. 1 showing one of the petroleum storage tanks equipped with oil circulating and spraying apparatus to promote solar topping.

Fig. 3 is an enlarged vertical section of the gas holder and oil ring shown in Fig. 1, taken on line 3—3 of Fig. 1.

Fig. 4 is a side view, partly in section, of part of a gas holder having weighting devices for providing a self balancing of the holders when a number are interconnected.

Figure 5:
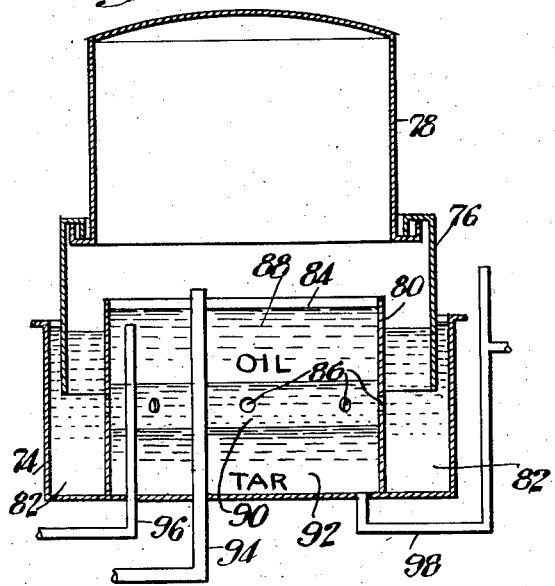
Fig. 5 is a vertical sectional view of a liquid storage gas holder that may be used in the apparatus illustrated in the above figures as well as in other storage apparatus.

In my present invention the oil or other liquid is stored in a closed storage tank and the atmosphere of gases above the stored liquid communicates with a gas holder adapted to hold a variable volume of gas under a substantially uniform, low pressure. The tanks are adapted to hold the gases and vapors evolved from the stored liquid under a pressure slightly greater than that of the gas holder without leakage or substantial distortion and, accordingly, when additional vapors are generated or the pressure is increased by the action of heat until the pressure is greater than the back pressure from the gas holder, the gas flows to the holder, the capacity of which expands under substantially constant pressure, so that no gases or vapors escape from the system. When the pressure in the storage tanks falls, due to a drop in temperature or in barometric pressure, and consequent tendency for the gases and vapors to contract and condense, the excess gases flow back from the holder, the holder being under sufficient pressure to cause the backward flow of the gas before it drops below atmospheric pressure and without drawing in any air from the outside atmosphere. The gas holder has a bell that is sealed in water and forms a closed system that avoids all contact between the outside atmosphere and the oil and vapor storage system.

When the gases are breathed out from the tanks, they are saturated with volatile vapors from the stored liquid, the volatile vapors corresponding to the vapors of gasoline, naphtha, and other light petroleum products. If desired, the condensable vapors may be abstracted from the system before the gases return to the storage tanks, by condensation or other suitable means, only the comparatively dry gases and uncondensable vapors being returned to be again saturated and expelled into the closed system. In this way, a preliminary removal or topping of the petroleum may be obtained without the use of additional refining equipment and using the sun as the source of heat. If desired means may be employed for accelerating the absorption of solar heat for this topping operation.

The number of tanks that can be served by a single holder is limited, depending on the sizes of the tanks and of the holder, the changes in temperature to which the system is subjected and similar conditions. When a very large number of tanks are located in a group requiring a number of holders, it is desirable to interconnect the holders and tanks so as to provide greater flexibility in the operation of the holders. For this purpose, it is desirable to have the holders so arranged that they rise and fall uniformly, that is, that one is not lifted to its upper limit and opportunity for the escape of gases afforded while the other holders are only partially filled. This is provided for in the present invention by providing the holder bells with weighting devices or drag buckets, or by varying the cross sectional area of the bells at different levels, so that a continuously increasing, gradual pressure is developed as the bell is lifted. Accordingly, if one bell is lifted to a height above that of the others, the increased pressure tends to force the gas to the other holders until they are brought to substantially the same level.

Gas holders of the usual type may be employed as a part or element of the storage system, but, as storage space is always in demand in a petroleum storage installation, or for the storage of tar, gas oil or other liquids in gas works, the present invention also provides an arrangement by which the interior of the gas holder sealing tank may be used, at the same time maintaining the necessary water seal. This is provided by means of chambers in the sealing tank in hydrostatic balance with the sealing water so that no severe stresses are developed on the chamber walls, and walls of light material may accordingly be employed. To maintain this hydrostatic balance, the chamber is in communication with the water seal and, in filling or emptying the storage chamber, water is displaced to or from the sealing space respectively.

Referring more particularly to the accompanying drawings, in Figs. 1, 2 and 3, petroleum or other liquid to be stored, is placed in storage tanks 10, 12 and 14, tightly closed against the entrance or escape of vapors or gases. The vapor spaces of the tanks connect with a main 16 by means of branch pipes 20, 22 and 24 respectively, and through the branch main 18 with a gas holder 26. Free communication is provided between the main 16 and the gas holder 26 so that vapors may flow back and forth under the slightest difference in pressure.

Development of a partial vacuum or pressure below atmospheric in any of the tanks 10, 12 and 14 is to be avoided, as it is very difficult, and practically impossible in the case of large storage tanks, to build tanks that will resist collapsing under an excess of external pressure, even though very slight, over the extensive areas of the tanks. The gas holder 26 is therefore arranged to maintain a sufficient pressure above atmospheric to force gas back to the storage tanks sufficiently rapidly to prevent the pressures from falling below atmospheric even with the most rapid cooling. For this purpose, the holder may be adapted to maintain a pressure of three or four inches of water, for example, within the holder. The tanks 10, 12 and 14 are also built vapor tight and capable of withstanding a pressure sufficiently above that of the gas holder to force gas to the holder under all conditions, without distortion or leaking. For this purpose, the tanks are preferably provided with a roof having the form of a portion of a sphere, similar to those of gas holders so that it will tend to stay in shape under pressure.

The gas holder 26 is provided with a water sealed bell 28 which rises and falls to maintain a substantially constant pressure as gas flows into and out of the holder, and is provided with guide frames 30 of the usual or any suitable type. The water sealing of the system prevents any contact of the atmosphere with the stored liquids or vapors and thus prevents any escape of the stored liquid into the atmosphere as long as the system remains unbroken.

When crude petroleum is stored, the vapors which are evolved into the gases circulating through the system contain those constituents that make up a large and most valuable part of gasoline. When desired, the condensable portion of these vapors may be recovered by passing the gases and vapors through a condenser as they flow back and forth between the holder 26 and the tanks 10, 12 and 14. Accordingly, with each backward and forward flow of the gases, a part of the liquid evaporated in the tanks 10, 12 and 14 by the sun's heat is recovered in the condenser as a gasoline distillate. When the production of a gasoline product in this manner is not desired, however, the gases are caused to flow through a by-pass pipe. When the by-pass pipe is used, rapid changes in the temperature of the stored liquid and gas are not necessary or desirable, but when a rapid production of gasoline in the condenser is desired, any suitable means may be used for causing a more rapid absorption of the sun's heat and for increasing the number of cycles of alternate heating and cooling.

The modification of the invention illustrated in Figs. 1, 2 and 3 is particularly adapted to encourage the recovery of gasoline through the heating effect of the sun, or by "solar topping". This is obtained by causing a stream of gases to circulate through the tanks, picking up light or gasoline vapors, extracting the condensable constituents from these vapors and return the denuded or dry vapors to the tanks to pick up a fresh charge of vapors. For this purpose the wet or saturated vapors are withdrawn from the tanks 10, 12, and 14 through branch pipes 32, 34 and 36, and mains 38 and 40, separate from the branches 20—24 and main 16, which are used for the return of dry or denuded gases, and pass through condensers 42 cooled sufficiently to condense vapors from the gases. The gases are then drawn from the condensers through a return pipe 44 by an exhauster-blower or booster 46 and supplied to the main 16 from which they are passed to the various tanks and permitted to pick up a fresh charge of vapors and return to the condensers 42. The booster 46 does not affect materially the pressures throughout the system as a whole nor in the various tanks and gas holder but acts merely to cause such a local pressure differential as to create a circulation of the gases and vapors. Accordingly, when the system is slowly heated by atmospheric changes which create an increase in pressure, the excess gas flows freely into the gas holder and when the system is cooled again the pressure drops below that of the gas holder, the gas freely flows from the holder to the tanks.

When the system is in normal operation in connection with the booster 46 it is preferred to have the holder, if it contains oil storage, serve in a similar manner to the other storage tanks. To accomplish this, the valves 48 in a by-pass pipe 50 and 52 in a pipe 54 are opened so that the dry gas from pipe 16 may pass through the holder and issue as wet gas into the pipe 40 from which it flows through the condenser and to the intake side of the booster. It will be understood that during this operation, all ordinary breathing may be effected without interrupting the general direction of gaseous flow. For example, when the system is gradually cooled, as by nightfall, the volume of dry gas passing to the holder will decrease, and the volume of wet gas leaving the holder will increase. Similarly, when the system is heated, as by increased heat from the sun, the volume of dry gas passing to the holder will increase, and the volume of wet gas leaving the holder will decrease.

When it is desired to secure a solar topping effect without the aid of the booster circulation, the valves 48 and 52 are closed, and the check valves 56 in pipe 18 and 60 in by-pass pipe 62 from the holder to the pipe 44 will operate in a manner to take advantage of the atmospheric changes that cause breathing, and will effect a direction of gaseous flow that will result in solar topping. For example, as the gaseous volume in the system diminishes, the surplus gas in the holder will flow out through the check valve 56 into the pipe 16 and thence to the tanks 10, 12 and 14. Similarly, when the gaseous volume in the system increases, the wet gas will flow out through the pipes 32, 34 and 36 into their respective gathering pipes 38 and 40, and thence through the condensers to pipe 44 and into the holder through the check valve 60.

This "solar topping" arrangement not only serves to cut down the variation in temperature and the rapidity of temperature changes in the tanks by maintaining them at a uniformly lower temperature, but also serves to obtain a product of high quality and value from the oil without the use of fuel or of expensive distillation apparatus, and, moreover, a product which is ordinarily lost in the usual type of storage.

When, as is usual in the case of the storage of high gravity crude petroleum, the petroleum contains dissolved gases which can not be condensed and held in their condensed form during storage, there is a gradual accumulation and increase in the gas within the holder or system. This gas may be piped off at intervals, passing through a suitable absorption system for the recovery of the last traces of condensable products. At times, as for example, where oil is being removed in large quantities, it may be necessary to supply gases such as natural gas or other gas, preferably of a non-oxidizing nature, to the system. For this purpose, inlet and outlet pipes 64 and 66 are provided controlled by valves 68 and 70, respectively.

Inasmuch as the bell or lift of the gas holder successively rises and falls in the sealing liquid this liquid should not be of a volatile or inflammable nature. The usual type of gas holder, having a water seal, is entirely suitable for this purpose. However, the tank in which this sealing water is contained has a large volume within the bell which would be very desirable for the storage of petroleum or its products and which is, in the usual type of gas holder, utilized only for the holding of a quantity of water of no value or utility except for the maintaining of the water level at the sealing space around the walls of the bell or lift.

To utilize this interior space for the storage of liquids lighter than water without interfering with the water seal, the present invention provides a sealing ring 72 of cheap and simple construction by which the interior space may be separated from the water sealing space and utilized for liquid storage. This is accomplished by enclosing the space at the interior of the tank by a ring of light weight so arranged that the liquid stored within this ring is in hydrostatic balance with the sealing liquid outside the ring, thus avoiding all tendency to collapse, or reducing such tendency to a negligible minimum.

Figure 7:
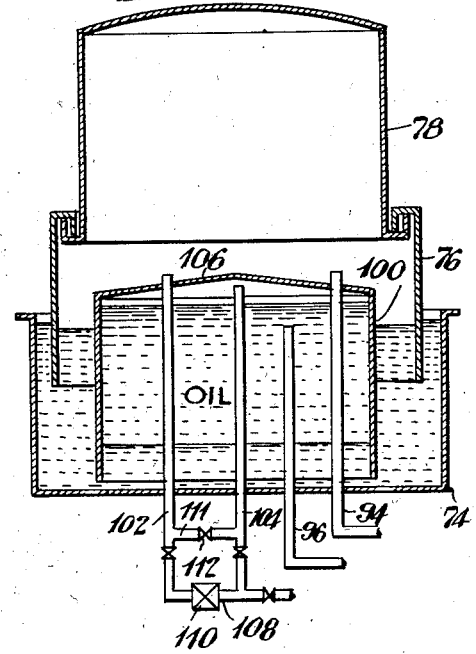
Fig. 7 is a vertical sectional view of another modification of the storage gas holder.
Figure 6:
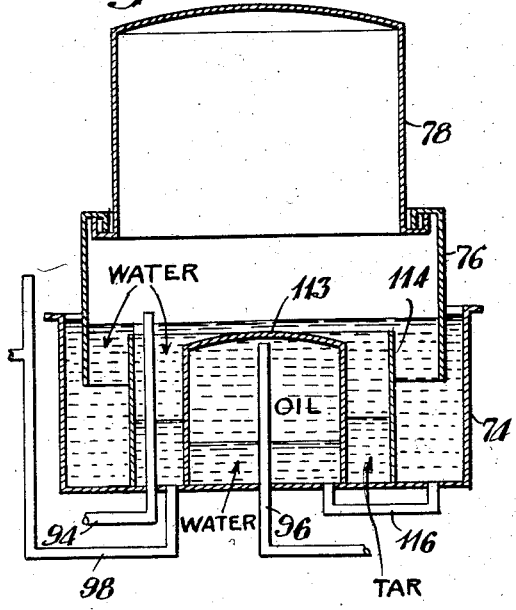
Fig. 6 is a vertical sectional view of a modified form of storage gas holder.

A number of modifications of the invention relating to this feature are shown in Figs. 5 to 7, the application of the storage system being illustrated in connection with the storage of oil lighter than water and also for the storage of liquids heavier than water, such as tar. The storage means may be applied to holders for artificial gas or other purposes not connected with the oil storage system illustrated above. The storage means is shown as placed within a water seal tank 74 into which dips the gas bell of the holder, a bell having two lifts 76 and 78 being shown by way of example.

In the form shown in Fig. 5 a single ring 80 is used of smaller diameter than the inner lift 78 and spaced from the wall of the tank 74 to form a water seal space 82 surrounding an inner liquid storage space 84. To maintain a hydrostatic balance between the inner storage space 84 and the water seal space 82, a number of holes 86 are provided in the ring 80 through which water may flow back and forth between the inner space 84 and the outer sealing space 82. The holes are so spaced, however, with relation to the volume of liquid to be stored and its gravity that no storage liquid can flow into the sealing liquid compartment. When the liquid stored is lighter than water, the holes 86 are positioned below the lowest level to which the stored liquid may extend and when the liquid is heavier than water, the communication between the two compartments is positioned above the highest level to which the stored liquid may reach. In the example given in Fig. 5, the ring is arranged to store both a liquid heavier, and a liquid lighter than water, and the holes are accordingly placed at a level approximately midway of the height of the ring, forming an upper oil zone 88, an intermediate water zone 90, and a lower tar zone 92.

Gas is introduced into and removed from the holder through a pipe 94 extending upwardly through the liquid storage space and opening into the gas space within the lifts in the usual manner. Oil is introduced through a pipe 96 extending and opening into the oil storage space 88 and tar or other liquid heavier than water is introduced and removed through a pipe 98 opening into the tar zone 92. In the use of the storage spaces, care must be taken not to fill the storage spaces to such an extent as to overflow through the openings 86 into the water seal space 82.

In the modification of the invention shown in Fig. 7, an oil storage ring 100, only, is used and is closed at its top and open at its bottom. When, as in this case, the ring is of large diameter, there would be considerable buoyant effect of the stored oil if the top of the ring were below the level of the water. Therefore, the ring is shown as of sufficient height to extend or project above the water level. In this case, communication between the top or gas space of the enclosed ring and the gas space provided by the bell is made by means of a pipe 102 opening into the bell gas space, a pipe 104 opening into the top of the ring below the cover 106, and a connecting pipe 108. A valve 110 may be provided in the pipe 108 to open in either direction under slight differentials in pressure but, when there is no pressure differential, and no flow of gases, to obstruct the diffusion of gases through the pipes. By this arrangement, the gas spaces above and below the cover 106 may be always placed in equilibrium while, at the same time, diffusion of gases between these spaces and contact of the stored liquid with the main body of gas in the holder is avoided or retarded, a feature which is desirable when the gas tends to dissolve in the oil and thus impair the illuminating value of the gas. A by-pass pipe 111 and valve 112 may be provided between pipes 102 and 104 for manual control, when desired.

In the modification shown in Fig. 6, the oil ring 113 is placed within or concentric with the tar ring 114. In this case, the oil ring is closed at the bottom, inasmuch as it is not desirable to have it communicate with the tar storage space, and communication is made between the bottom of the oil ring and the water seal space by means of a communicating pipe 116.

In the oil storage system of the present invention, a number of oil storage tanks are connected to a single gas holder or movable cover storage tank, the number shown in the above embodiments being shown merely by way of example. The number of tanks which can be operated by a single holder or holder tank of the size suitable for, or selected for, this purpose is, however, limited. Where a tank farm contains more tanks than a single holder will operate, the tanks are connected in groups to different holders, which may then be interconnected so that an abnormal demand for gas or for storage space made on the holder may be taken up by the other holders. Although these holders should have substantially equal pressures at the same altitude of the lifts, it is difficult, and in some cases impossible, to obtain a perfect pressure balance between all of the holders and, accordingly, as a very small differential pressure would cause the gas to slowly flow to, and accumulate in, a single holder of the lowest pressure until the pressures were equalized, it might frequently happen that one holder would be filled to overflowing before any considerable capacity were utilized in the other holders.

Figure 8:
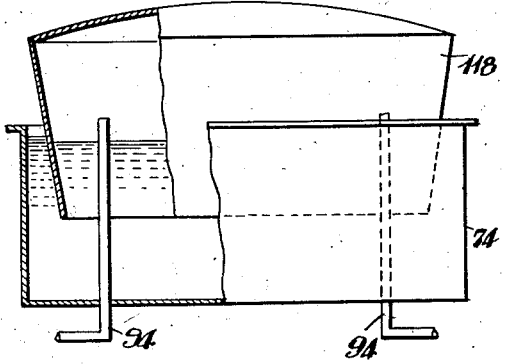
Fig. 8 is a sectional view of a self balancing gas holder, the side walls being shown with exaggerated slopes.

The present invention therefore provides a holder so arranged that it is caused to create a substantial increase in back pressure before reaching the upper limit of its capacity and thus cause any other holders connected therewith to receive their proportionate share of gas before any holder is overloaded. In the modification shown in Fig. 8, this is accomplished by varying the cross sectional area of the bell or lift so that the pressure is varied as the bell rises. By decreasing the diameter of the shell 118, or slanting it inwardly, as indicated in Fig. 8, the weight of the holder bell is thereby distributed over a smaller area at the water level, the pressure per square inch is increased, and the greater pressure thrown on the gas causes it to be distributed proportionately among the other holders.

In the modification shown in Fig. 4, the increase in gas pressure is obtained by weighting the holder bell as it rises out of the sealing liquid. This is obtained by mounting a series of drag buckets or liquid holding chambers 120 at spaced intervals about the circumference of the holder bell. The buckets are shown as mounted on the interior surface of the shell 119 of the gas bell. The buckets are provided with a number of holes or openings 122 at different heights, which may be plugged separately of each other. When the bell sinks into the sealing liquid, the buckets fill with water and, as the bell rises, the water flows out of the buckets until the lowest open or unplugged opening of each bucket is reached. As the bell rises further, it lifts this water remaining in the buckets and thus rapidly adds to the weight of the bell and rapidly increases the internal gaseous pressure within the bell. The openings 122 are provided with small sealing tubes 124, the outer ends of which may be closed by means of individual caps 126, and a pipe 128 is provided to extend through the top of the bell for filling the buckets when they are first filled before sinking into the sealing liquid. If desired, the drag buckets may be used to exert a buoyant effect by emptying them of water and sealing them against the inflow of water, thus reducing the pressure within the bell.

The type of roofs employed on oil storage tanks of large capacity is usually conical in form and could not resist the pressures to which they would be subjected at times in the operation of the present invention, as they would tend to assume a shape having a spherical curvature with a consequent tearing and leakage through the roof. For tanks of this type therefore, roofs of a spherical curvature should be employed, such as those commonly used for the top of the bell of a gas holder. With spherical type roofs, there is no tendency for distortion, all of the stresses being resolved into normal bursting strains.

These strains, however, create a central pull on the curb or circumferential portion of the tank where the roof plates join the side wall of the tank, and tend to pull the curb and side walls inwardly and crumple them. This stress is resisted in the usual type of gas holder roof by making the outer course or courses of plates on the roof of extra heavy or thick metal. The weight of metal, however, required for this purpose is large because the plates are not at a right angle to the wall of the tank but curve upwardly with the curvature of the roof, and accordingly are not in the best position to resist the compression stresses exerted on the curb.

While any suitable type of gas holder roof may be employed for this purpose, the present invention also provides a tank roof having a spherical curvature and a curb reinforcement by means of a plate or structure adapted to re-inforce the curb and take a large part of the compression stresses from the outer roof plates. For this purpose a plate 130, Fig. 2, encircling the curb and lying in a flat, horizontal plane is joined to the side wall 134 and the roof plates 136 of the tank or holder by means of flanges 138 and 140 integral with the plate 130 and extending in planes flat with the plates 134 and 136, respectively.

In some cases it may be desirable to increase the rate at which volatile vapors are vaporized by the solar heat into the gaseous space within the tanks in order that the recovery of these products from stored crude may be speeded up. This may be accomplished by spraying oil from the body of the tank into the gaseous space thereabove or against the inner surface of the roof of the tank where the tendency for evaporation is greatest. For this purpose, a small stream of the stored oil is drawn from the draw-off pipe 137 through a branch pipe 138 by means of a circulating pump 140 and forced through a number of sprays 142 immediately beneath the roof of the tank. To enable these sprays to be removed for cleaning, they are mounted on a pipe 144 extending downwardly through an enclosing sleeve 146 which is tightly fitted through the roof of the tank and is tapered inwardly at its lower end to fit the pipe 144.

While the invention has been described particularly as applied to an oil storage system, it is to be understood that it may be used on active tanks such as surge tanks of pipe line systems, run down tanks, work tanks, lease tanks, and, in general, wherever it may be used to advantage in the storage of volatile fluids. It is to be understood, moreover, that when a volatile product is separated from the stored liquid under conditions in which such a separation is not desired, as, for example, in the case of petroleum in transit in pipe line systems, it may be returned to the body of the stored liquid.

As changes of construction could be made within the scope of my invention, it is desired that all matter contained in the above description or shown in the accompanying drawings shall be interpreted as illustrative and not in a limiting sense.

Having thus described my invention, what I claim as new is:

1. In apparatus for storing and treating volatile liquids, a liquid storage tank having a gas-tight roof exposed to solar heat, means for drawing liquid from the lower part of said tank and spraying it into the portion of said tank immediately beneath said roof, a condenser, and means for conducting gases and vapors from the upper part of said tank through said condenser and returning uncondensed constituents to said tank.

2. In apparatus for storing and treating volatile liquids, a liquid storage tank having a gas tight roof exposed to solar heat, means for drawing liquid from the lower part of the tank and spraying it into the tank immediately beneath said roof, a gas holder, a condenser, and pipes forming a closed circuit between said tank, said gas holder, and said condenser, to permit the free expansion of gases between said tank and holder through said condenser.

3. In apparatus for storing and treating volatile liquids, a liquid storage tank having a gas tight roof exposed to solar heat, means for drawing liquid from the lower part of the tank and spraying it into the portion of the tank immediately beneath said roof, means for abstracting condensable constituents from gases, and means for circulating gas in a closed circuit between the upper part of said tank and said abstracting means.

4. In apparatus for storing and treating volatile liquids, a plurality of sealed oil storage tanks exposed to solar evaporation, a variable volume gas holder having an inner oil ring forming an inner oil storage compartment and an outer water seal compartment in hydrostatic equilibrium, a lift for said holder of variable gas storage capacity; said lift being sealed in said water compartment, a condenser, means for circulating oil from the lower to the upper part of each of said tanks, and a breather line connecting the interior of said holder lift with said condenser and with the gas space at the top of each storage tank whereby free passage of gas takes place back and forth between said storage tanks and said lift through said condenser as the pressure in any of said storage tanks tends to change from the substantially uniform pressure maintained by said lift.

5. In apparatus for storing and conserving volatile liquids, a plurality of sealed liquid storage tanks exposed to solar heat, means for circulating liquid between the upper and lower parts of each of said tanks to increase evaporation thereof, and a vapor breathing line connecting the tops of each of said tanks and a variable volume gas storage holder forming with said line and tanks a closed system, said holder being operable to maintain each of said tanks under substantially constant pressure to thereby prevent collapse of said tanks due to temperature changes or changes in volume of liquid stored therein.

6. In apparatus for storing and conserving petroleum, a sealed storage tank exposed to solar heat and having an oil storage space and a vapor space, means for drawing stored petroleum from said oil storage space and spraying it into said vapor space, a gas storage member constructed to provide a variable volume for the storage of gas and vapors, a conduit forming a closed circuit between the vapor space of said tank and the gas storage member, and means combined with said conduit whereby vapors of normal liquid constituents are removed from gas circulating between said tank and said storage member.

7. A method of treating volatile liquids exposed to solar evaporation in storage comprising, drawing a stream of liquid from a body thus stored, spraying said stream into a gas space overlying said stored liquid and permitting the sprayed liquid to fall back to said body, withdrawing gases and vapors from said space, removing condensable constituents from said withdrawn gases, and returning the remaining gases to said space.

8. A method of treating hydrocarbon oils in storage which comprises holding said oils in closed tanks exposed to solar heat, permitting gas in contact with said oils to expand into a gas holder of variable volume under slight pressure, spraying oil from said body of oil into said gas in contact with said oil, and extracting the condensable vapors from the gas passing to said holder.

WILBUR G. LAIRD.